United States Patent Office 3,720,754
Patented Mar. 13, 1973

3,720,754
PROCESS FOR THE ENTRAPMENT AND
RECOVERY OF SULFUR DIOXIDE GAS
Harold W. Wilson, El Paso, Tex., assignor to
The Golden Cycle Corporation
No Drawing. Continuation-in-part of application Ser. No. 777,503, Nov. 20, 1968. This application Dec. 18, 1970, Ser. No. 99,509
Int. Cl. C01b 17/60
U.S. Cl. 423—244
11 Claims

ABSTRACT OF THE DISCLOSURE

A process is disclosed wherein sulfur dioxide gas or sulfur dioxide containing waste stack gases, are passed into a bed of mixed metallic oxides and silicates which contains not less than about 1% or more than about 10% of its weight in added water to produce a dry, particulate product comprising metallic sulfite salts, meta-silicic acid, adsorbed sulfur dioxide, and unreacted oxidic and siliceous material of a kind and amount dependent upon the chemical nature and reactability with sulfur dioxide gas of the metallic oxide silicate material processed. The product when subsequently moderately heated releases substantially equimolar amounts of sulfur dioxide in conjunction with the release of only minor amounts of water.

---

This application is a continuation-in-part of my earlier copending application, Ser. No. 777,503, filed Nov. 20, 1968, now abandoned.

The present invention relates to the utilization of sulfur dioxide and acidic sulfur dioxide containing gases emitted as waste and air pollutant and commonly referred to as "waste stack gases" such as emitted during the processing of sulfide ores and in the burning of sulfur-containing coals, for example. More particularly, the present invention relates to a process for the entrapment and recovery of sulfur dioxide gases from waste stack gases with mixed metallic oxides and metallic silicates. More specifically, the present invention relates to a dry process for the separation, storage and recovery of sulfur dioxide from sulfur dioxide gases and acidic sulfur dioxide containing waste stack gases.

It has been proposed heretofore to recover sulfur dioxide, such as from sulfur dioxide containing waste stack gases, by passage thereof through an aqueous system containing suspended particulate mixed metallic oxides and mixed metallic silicates whereby the sulfur dioxide combined with water to form sulfurous acid which in turn reacted with the metallic oxides and metallic silicates to form metallic sulfite salt and dihydrated silicic acid which results in the formation of a liquid or hydro-gel system containing the products of reaction and water which systems could for example be further processed such as by heating to effect the release of water and entrapped sulfur dioxide.

However, such a process is characterized in that the use of relatively large amounts of water to promote acid hydrolysis of the mixed metallic oxides and metallic silicates results in products retaining large amounts of water that have to be removed in recovering the sulfur dioxide contained in the products. Additionally, the presence of excessive water causes the formation of completely hydrated salts of both sulfite and sulfate sulfur as well as the formation of di-hydrated silicic acid. In addition to the relatively great amount of heat necessary to recover sulfur dioxide from such reaction products, an oxide-silicate residue of poor chemical reactivity and absorptivity, in comparison with the residues obtained from use of the instant process, is obtained.

It is an object of the present invention to provide an improved process for the entrapment and recovery of sulfur dioxide gas by a relatively dry process wherein restricting the amount of water present results in only partial hydration of the sulfite salts formed and in little if any di-hydrated silicic acid whereby the product can be processed far more economically than possible heretofore for recovery of the sulfur dioxide content thereof.

Another object of the present invention is to provide a relatively dry process for the entrapment and recovery of sulfur dioxide gas by passage thereof into a bed of particulate mixed metallic oxide and silicates and wherein the content of uncombined water at any one time in the mixed metallic oxide silicate is generally from about 1% to about 10% by weight of the oxidic-siliceous material.

A further object of the present invention is to provide an improved process for the entrapment and recovery of sulfur dioxide gas wherein sulfur dioxide gas, water in limited quantities, and finely divided mixtures of metallic oxides and silicates are brought into intimate contact with all such components being mixed in such proportions that the resultant product at any time during or after the preparation is neither a liquid, a hydro-gel, or ever contains at any given time more than a maximum of about 10% of its weight of uncombined water, while to all appearances the material utilized for the entrapment of the sulfur dioxide remains as dry finely divided solid particles.

Still another object of the present invention is to provide an improved process for obtaining a dry, solid product which contains little if any uncombined water and is composed essentially of metallic sulfite salts, meta-silicic acid, absorbed and adsorbed sulfur dioxide, and chemically unreacted oxidic and siliceous matter of a kind and amount dependent upon the chemical nature and reactability with sulfur dioxide gas of the metallic oxide-silicate material utilized.

Still another object of the present invention is to provide an improved process for the entrapment of sulfur dioxide gas whereby there is obtained a dry, solid product containing minimum amounts of either elemental sulfur or sulfate sulfur to minimize auto-oxidation of sulfur dioxide and limit hydrolytic reactivity and which product by heat decomposition will liberate chemically uncombined, relatively pure sulfur dioxide gas.

Still a further object of the present invention is to provide an improved process for the entrapment and recovery of sulfur dioxide gas wherein a mixed metallic oxide-silicate, subsequent to having been utilized to entrap sulfur dioxide gas, may be reused for the entrapment and recovery of an additional moiety of sulfur dioxide gas, and which recovered material is generally recovered in the form of a metallic oxide-metasilicic acid material characterized by a high degree of acid reactability, absorptivity and adsorptivity.

Further objects and aspects of the present invention will become apparent from the following more detailed description of the invention.

Briefly, the present process for the entrapment and recovery of sulfur dioxide gas comprises passing sulfur dioxide or sulfur dioxide-containing waste gases, into a bed of particulate, finely divided, mixed metallic oxides and silicates, or previously recycled oxidic-siliceous material, and wherein the gaseous input has entrained therein, or supplied therewith, a critical water content comprising, by weight, no less than about 1% to no more than about 10%, preferably about 3–7%, of the particulate finely divided mixed metallic oxide-silicate bed forming material. While it was first thought from laboratory experimentation that the maximum adsorbed water content for the bed materials of the present invention should be about 7%, it has been found as a result of recent pilot plant operations that the maximum amount for the critical adsorbed water content of the bed may go as high as about 10%. This critical adsorbed water content can be introduced to the bed materials in a variety of techniques. It may be introduced prior to or with the input gas in the form of supersaturated steam, or it may be sprayed directly onto the bed by mechanical means. The only essential criteria is that sufficient water be added prior to and during the beds exposure to being gassed with $SO_2$ or with sulfur dioxide containing waste gases to maintain the specified critical water concentration during the entire period of gassing.

The addition of this critical quantity of water to the particulate mixed metallic oxides and silicates or recycle oxidic-siliceous material of the present invention is immediately taken up by the solid particles such that the dry, free flowing character of the bed is not significantly altered. It is believed that water in this small quantity is adsorbed by, but chemically unreacted with, the bed particles in the sense that the water molecules apparently become either water molecules of hydration or merely physically attached to the bed particle surfaces. The precise action of the water molecules is not fully understood and, therefore, it is not intended that his invention be limited to any specific chemical theory. However, it is known that a critical water quantity, i.e. from about 1% to about 10% by weight of the particulate bed materials, must be available on the surface of the bed particles, or in other words "adsorbed," in order to accomplish the significantly improved $SO_2$ entrapment results of the present invention. The extent of both the degree of hydration of the sulfite salt products of reaction and the formation of meta-silicic acid is controlled by introducing no more water into the system at any one time than is necessary to permit the formation of hydrated salts of sulfite sulfur containing no more than a maximum of 2½ mols of water per mol of sulfite salt, such as in the case of hydrated ferrous sulfite $FeSO_3.2½H_2O$, nor more than 2 mols of water per mol sulfite salt in the cases of other bivalent metals, such as calcium $CaSO_3.2H_2O$, where such sulfite salts are heat decomposible at temperatures of 250° C. for the ferrous sulfite and 200° C. for the calcium sulfite. Accordingly, it will be appreciated that use of controlled amounts of water during passage of the sulfur dioxide containing gas into the particulate bed results in the formation of reaction products that can be processed far more economically for the recovery of their sulfur dioxide content than can sulfur dioxide entrapment reaction products obtained by prior processes.

In the latter regard, coincident with the recovery of the sulfur dioxide content of reaction products resulting from the carrying forth of the present process and in order to minimize the formation of either ferric iron or sulfate sulfur during the heat decomposition of the sulfite salt for recovery of sulfur dioxide, oxygen is excluded, or essentially so, from the sulfite salt product of the present invention by maintaining a sulfur dioxide gas blanket over the salt being heated. By excluding oxygen by means of the sulfur dioxide blanket during heat decomposition of the sulfite salt product for recovery of the sulfur dioxide content thereof, the sulfur dioxide-freed residue obtained is suitable for reuse for entrapment of additional sulfur dioxide. The metallic oxides of the residue, such as iron oxide for example, are maintained in a predominantly unoxidized state, e.g. ferrous iron rather than ferric iron, and, as such, the oxide in physical combination with highly adsorbent metasilicic acid results in a highly acid reactive, highly adsorbent material which is suitable for reuse as the oxidic-siliceous material for entrapment of an additional moiety of sulfur dioxide gas by the process disclosed herein.

With further regard to the metallic oxides-silicates which can be utilized in carrying forth the process of the present invention, a great number of naturally occurring mineral substances can be used and wherein the following are examples of such mineral substances which are reactable with sulfur dioxide gas and controlled amounts of water to form hydrated salts of sulfite and metasilicic acid as the products of reaction:

Helvite—$3(FeMn)O \cdot Mns \cdot 3BeO \cdot 3SiO_2$;
Allanite—$4(CaFe)O \cdot 3(Al,Ce,Fe,Bi)_2O_3 \cdot 6SiO_2$;
Iolite—$4(MgFe)O \cdot 4Al_2O_3 \cdot 10SiO_2 \cdot H_2O$;
Anorthite—$4(FeO \cdot CaO \cdot Fe_2O_3 \cdot 4SiO_2 \cdot H_2O$;
Ilvaite—$CaO \cdot Al_2O_3 \cdot 2SiO_2$;
Chrysolite—$2(MgFe)O \cdot SiO_2 \cdot H_2O$; and
Chrysotile (asbestos)—$3MgO \cdot 2SiO_2 \cdot 2H_2O$; etc.

Additionally, mixtures of combinations of metallic oxides and metallic silicates of either natural or synthetic origin can be employed. For example, synthetically prepared ferrous oxide FeO can be admixed with synthetic wollastonite $CaSiO_3$ and with naturally occuring olivine $MgFeSiO_4$ in ratios of about 3 parts by weight of the ferrous oxide to 1 part by weight of each of the ferrous content olivine and the calcium silicate of the wollastonite to produce a highly suitable combination of oxide-silicate material for use in this process.

The mixture of metallic oxides and silicates preferred for use in this process comprises a combination, by weight, of approximately 3 parts of ferrous oxide to 2 parts of ferrous silicate $FeSiO_3$ to 1 part of any one of or any combination of oxides and/or silicates of calcium, magnesium, aluminum, and manganese. However, oxide and silicate groups attached to any of the metals of Group VIII, and metals of the first and second sub-groups of the Periodic Table, along with calcium, magnesium, and manganese are suitable for use in the proposed process.

Since natural mineral substances must first be located, then mined and processed for use, and their composition is usually highly variable, it is preferred to use waste materials presently existing in large aggregate piles, which waste materials are relatively homogeneous in their contents of chemically combined metallic oxides and silicates which materials are commonly referred to as "waste smelter slags" such as those derived as wastes from pyrometallurgically refining pyritic ores of copper.

Such waste slags are identified by the following typical analysis:

32%–38% silicon dioxide, present as mixed silicates of iron, calcium, magnesium, and aluminum
28%–32% iron, present predominantly as ferrous oxide and ferrous silicates
8%–10% calcium oxide, present as silicate
6%–8% aluminum oxide, present as silicate
.1%–.5% copper, present as metal and oxide
0–.5% lead, present as metal
0–1% sulfur, present in sulfide form The following example is included to more specifically illustrate the carrying forth of an exemplary mode of the process comprising the present invention. While the example sets forth the use of a finely divided particulate waste slag, such as of an exemplary composition as set forth hereabove, which material is of approximately 90% minus 200 mesh U.S. Standard sieve, it will be appreciated that both the type of oxidic-siliceous material, and the mesh size thereof, is merely exemplary.

1,000 grams of dry pulverized waste slag from the reverberatory refining of copper pyritic ore was placed in a suitable vessel. By use of a triple delivery tube sulfur dioxide gas, 98+% $SO_2$, atmospheric air, and water vapor, i.e. steam, were passed simultaneously into the dry, pulverized slag. The amounts of sulfur dioxide gas, atmospheric air, and water vapor passed into the slag were regulated so that the resultant mixture approximated 4–6% $SO_2$, 4–6% water, and 88–92% air by weight of the waste slag. Both the rate of passage and the amount of gaseous material passed into the dry slag was regulated so that all, or practically all, of the sulfur dioxide gas became chemically combined and adsorbed until no additional sulfur dioxide gas was accepted or retained, as determined by the detection of sulfur dioxide gas in the air downstream of the slag being processed. The 1,000 grams of waste slag reacted with approximately 420 grams of sulfur dioxide gas, in the presence of the aforementioned percentage range of water, to give a dry, particulate product containing approximately 30% by weight of sulfur dioxide. From the foregoing it will be understood that at all times during the passage of the gaseous materials into the slag the products of reaction were to all appearances "dry" finely divided solids but in actuality the solid particles of the system contained some adsorbed water on their surfaces. The particulate sulfite salt-metasilicic acid absorbed $SO_2$ product so derived can be stored, shipped or treated for recovery of the sulfur dioxide.

In the latter regard, the particulate product was transferred to a heating vessel which permitted heating the product under a sulfur dioxide gas blanket, thus in the general absence of oxygen, to a temperature in the range of about 205° C. to 300° C. thereby effecting decomposition of the sulfite salts and release of chemically combined, absorbed and adsorbed sulfur dioxide wherein all such liberated and released sulfur dioxide gas was collected by conventional means. The heat processed solid residue freed of both chemically and physically combined sulfite sulfur was allowed to cool to ambient temperature and stored for reuse. Heat treatment in the manner set forth hereinabove resulted in a sulfur dioxide recovery of 405 grams, of 100% $SO_2$ which comprises a 97% recovery of the 420 gram input of sulfur dioxide to the 1,000 grams of waste slag.

It is pointed out that while the foregoing example utilized water vapor accompanying the sulfur dioxide gas in order to impart the critical water concentration to the waste slag, it is to be clearly understood that this added water may be introduced separately as by spraying or the like prior to and during the gassing period.

The foregoing is considered as illustrative only of the principles of the invention. Further, since numerous modifications and changes will readily occur to those skilled in the art, it is not desired to limit the invention to the exact method, operation and product shown and described, and accordingly all suitable modifications and equivalents may be resorted to, falling within the scope of the invention.

What is claimed as new is as follows:

1. A process for the entrapment and recovery of sulfur dioxide gas comprises the steps of:
   (a) passing a sulfur dioxide containing gas into a bed comprising as essential components substantially dry particulate mixed metallic oxides and mixed metallic silicates selected from the group of oxides and silicates of the metals of Group I–A, Group I–B, ferrous iron, cobalt, nickel, ruthenium, rhodium, osmium, iridium, platinum, calcium, magnesium and manganese containing an adsorbed water content of about 1% to about 10% by weight of the mixed metallic oxides and mixed metallic silicates maintained at all times during said process to produce a substantially dry particulate product comprising metallic sulfite salts, metasilicic acid, adsorbed and absorbed sulfur dioxide and unreacted oxidic and siliceous matter; and
   (b) heating the dry particulate product in a substantially sulfur dioxide atmosphere to a temperature in the range of about 205° C. to about 300° C. to effect decomposition of the sulfite salts and release of sulfur dioxide.

2. The process of claim 1 including the step of recovering the particulate residue remaining after step (b) for the entrapment of additional sulfur dioxide.

3. A process for the entrapment and recovery of sulfur dioxide gas which comprises the steps of:
   (a) passing a sulfur dioxide containing gas into a bed comprising as essential components substantially dry particulate mixed metallic oxides and metasilicic acid having an adsorbed water content of about 1% to about 10% by weight of the mixed metallic oxides and metasilicic acid maintained at all times during said process, said mixed metallic oxides selected from the group of oxides of the metals of Group I–A, Group I–B, ferrous iron, cobalt, nickel, ruthenium, rhodium, palladium, osmium, iridium, platinum, calcium, magnesium and manganese, to produce a substantially dry particulate product comprising metallic sulfite salts, metasilicic acid, adsorbed and absorbed sulfur dioxide, and unreacted oxidic and siliceous matter; and
   (b) heating the substantially dry particulate product in a substantially sulfur dioxide atmosphere to a temperature in the range of about 205° C. to about 300° C. to effect decomposition of the sulfite salts and releast of sulfur dioxide.

4. The process of claim 3 including the step of recovering the particulate residue remaining after step (b) for the entrapment of additional sulfur dioxide.

5. A process for the entrapment of sulfur dioxide gas comprising:
   (a) establishing a substantially dry bed having as essential components particulate mixed metallic oxides and mixed metallic silicates selected from the group of oxides and silicates of the metals of Group I–A, Group I–B, ferrous iron, cobalt, nickel, ruthenium, rhodium, palladium, osmium, iridium platinum, calcium, magnesium and manganese containing an adsorbed water content of about 1–10% water based on the weight of the mixed metallic oxides and mixed metallic silicates; and
   (b) passing a sulfur dioxide containing gas into contact with said bed to chemically react with the bed constituents whereby a substantially dry particulate product of metallic sulfite sales, metasilicic acid, adsorbed and absorbed sulfur dioxide, and unreacted oxidic and siliceous matter is produced, said reaction occurring at a temperature where said 1–10% water is maintained adsorbed on said bed at all times during said process and where stable metallic sulfites and metasilicic acid are produced.

6. The process of claim 5 wherein the adsorbed water content of the mixed metallic oxides and mixed metallic silicates is maintained during the passage of the sulfur oxide containing gas into the substantially dry bed by including with said sulfur dioxide containing gas a sufficient quantity of supersaturated steam.

7. The process of claim 5 wherein the absorbed water content of the mixed metallic oxides and mixed metallic silicates is maintained by spraying or by addition through other mechanical means a sufficient quantity of water onto said particulate mixed metallic oxides and mixed metallic silicates during the passage of said sulfur dioxide containing gas into said substantially dry bed.

8. The process of claim 5 wherein said adsorbed water content is about 3–7% water based on the weight of the mixed metallic oxides and mixed metallic silicates.

9. A process for the entrapment of sulfur dioxide gas comprising:
   (a) establishing a substantially dry bed having as essential components particulate mixed metallic oxides and metasilicic acid containing an adsorbed water content of about 1–10% water based on the weight of the mixed metallic oxides and metasilicic acid, said mixed metallic oxides selected from the group of oxides of the metals of Group I–A, Group I–B, ferrous iron, cobalt, nickel, ruthenium, rhodium, palladium, osmium, iridium, platinum, calcium, magnesium and manganese; and
   (b) passing a sulfur dioxide containing gas into contact with said bed to chemically react with the bed constituents whereby a substantially dry particulate product of metallic sulfite salts, metasilicic acid, adsorbed and absorbed sulfur dioxide, and unreacted oxidic and siliceous matter is produced, said reaction occurring at a temperature where said 1–10% water is maintained adsorbed on said bed at all times during said process and where stable metallic sulfites and metasilicic acid are produced.

10. The process of claim 9 wherein said adsorbed water content is about 3–7% water based on the weight of the metallic oxides and metasilicic acid.

11. The process of claim 5 wherein said particulate mixed metallic oxides and mixed metallic silicates comprise about 3 parts by weight ferrous oxide, 2 parts by weight ferrous silicate and 1 part by weight selected from the group of oxides and silicates of Ca, Mg, Al, Mn and mixtures thereof.

References Cited
UNITED STATES PATENTS

| | | | |
|---|---|---|---|
| 1,335,348 | 3/1920 | Patrick et al. | 23—178 |
| 2,927,851 | 3/1960 | Wilson | 71—32 |
| 3,454,354 | 7/1969 | Kerr | 23—2 |
| 3,454,356 | 7/1969 | Raman | 23—178 X |
| 3,336,401 | 1/1968 | Pierre et al. | 55—73 |
| 3,492,083 | 1/1970 | Lowicki et al. | 23—178 |
| 3,580,702 | 5/1971 | Myers et al. | 23—178 S |

OSCAR R. VERTIZ, Primary Examiner

C. B. RODMAN, Assistant Examiner